Dec. 21, 1965 B. MIKUSCH 3,224,332
AFOCAL WIDE-ANGLE SUPPLEMENTARY OBJECTIVE
Filed May 1, 1962
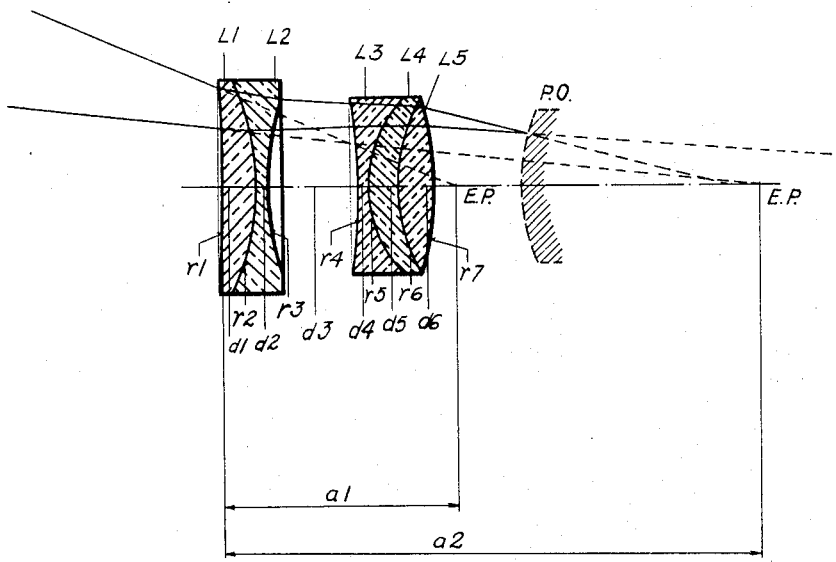

United States Patent Office 3,224,332
Patented Dec. 21, 1965

3,224,332
AFOCAL WIDE-ANGLE SUPPLEMENTARY
OBJECTIVE
Berta Mikusch, Vienna, Austria, assignor to Karl Vockenhuber and Christl Hauser, both of Vienna, Austria
Filed May 1, 1962, Ser. No. 191,527
Claims priority, application Austria, May 10, 1961,
A 3,680/61
3 Claims. (Cl. 88—57)

The present invention relates to an afocal wide-angle supplementary objective or an attachment for objectives of different focal length, in particular for variofocal objectives.

Such wide-angle supplementary objectives or attachments are designed in the manner of a reversed Galilean telescope and comprise a cemented negative front component and a positive cemented component, facing the main objective.

While supplementary objectives or attachments for normal objectives with fixed focal length can be designed for a constant angular field and a fixed position of the entrance pupil of the objective-combination, these factors are relatively widely variable with supplementary objectives or attachments for variofocal objectives and for a number of objectives of different focal length, whereby considerable problems occur when correcting such objectives.

It is, therefore, one feature of the present invention to provide an afocal wide-angle supplementary objective, wherein the difficulties of the known structures are overcome.

It is another feature of the present invention to provide an afocal wide-angle supplementary objective, wherein the positive component has two cemented surfaces, whereby the cemented surface near the following main objective has a positive refractive power and the second cemented surface has a negative rerfactive power and both cemented surfaces are concave towards the main objective. The new wide-angle supplementary objective or attachment is especially suited for variofocal objectives with a large entrance pupil distance, as referred to below as the distances $a_1$ and $a_2$.

It is still another feature of the present invention to provide an afocal wide-angle supplementary objective, constituting an advantageous embodiment of the present invention, wherein the radius of the cemented surface having positive refractive power of the positive component, the $n_d$-difference or the difference of the refractive index for the $d$-lines of the helium-spectrum of the two cemented elements being at least 0.15, is not greater than 1/3 of the focal length of the positive component, whereas the radius of the cemented surface having negative refractive power of the positive component, the $n_d$-difference of the two cemented elements being at least 0.07, is 1/4 to 1/3 of the focal length of the positive component. By selecting suitable radii of the respective cemented surfaces and $n_d$-differences, it is possible to change the rays, such that a negative component can be used, which faces the main objective with a relative flat, concave outer surface, whereby the length of the supplementary objective in axial direction is extremely short and the diameter of the negative component is only 20% larger than the diameter of the positive component.

It is yet another feature of the present invention to provide an afocal wide-angle supplementary objective, wherein in order to achieve a satisfactory correction over the total range of use, it is essential that the negative component consists of two lenses the cemented surface of which has a negative refractive power and that the outer surface facing the object is plane or concave with low curvature, whereas the radius of the outer surface, facing the main objective, is approximately 2/3 of the focal length of the negative component or greater.

It is a still further feature of the present invention to provide an afocal wide-angle supplementary objective, wherein the cemented surfaces join abnormal glasspairs in the negative and in the positive component, the abnormal glasspairs being defined, such that one lens shows a higher $n_d$-value and a respectively higher Abbé's dispersion number than the adjoining lens.

With these and other objects in view, which will become apparent in the following detailed description, the present invention will be clearly understood in connection with the accompanying drawing, in which the only figure shows diagrammatically an axial section of the afocal wide-angle supplementary objective.

Referring now to the drawing, in accordance with the numerical examples, the radii of the lenses are depicted as $r_1$ to $r_7$, the thicknesses of the lenses and the air distances are depicted as $d_1$ to $d_6$, the refractive indices for the $d$-line of the helium spectrum are depicted as $n_{d1}$ to $n_{d6}$, the Abbé-numbers are depicted as $v_1$ to $v_6$, the focus of lens members I and II are depicted as $f_I$ and $f_{II}$, respectively, and the refractive power of the objective members I and II are depicted as $\phi_I$ and $\phi_{II}$, respectively.

*Embodiment I*

[Magnification: 0.68]

| | | | | |
|---|---|---|---|---|
| $r_1=-263.10$ | $d_1=6.1$ | $n_{d1}=1.6208$ | $v_1=31.1$ | $f_I=-68.0$ |
| $r_2=-45.96$ | $d_2=2.3$ | $n_{d2}=1.6584$ | $v_2=50.9$ | $\phi_I=40.6$ |
| $r_3=+57.91$ | $d_3=17.4$ | Air distance | | |
| $r_4=-115.06$ | $d_4=1.9$ | $n_{d4}=1.6976$ | $v_4=38.7$ | |
| $r_5=+23.07$ | $d_5=5.4$ | $n_{d5}=1.6208$ | $v_5=31.1$ | $f_{II}=+100.0$ |
| $r_6=+32.47$ | $d_6=8.0$ | $n_{d6}=1.7885$ | $v_6=50.5$ | $\phi_{II}=33.8$ |
| $r_7=-59.25$ | | | | |

*Embodiment II*

[Magnification: 0.68]

| | | | | |
|---|---|---|---|---|
| $r_1=-244.33$ | $d_1=5.8$ | $n_{d1}=1.5750$ | $v_1=41.3$ | $f_I=-68.0$ |
| $r_2=-43.28$ | $d_2=2.2$ | $n_{d2}=1.6204$ | $v_2=60.3$ | $\phi_I=40.6$ |
| $r_3=+55.57$ | $d_3=16.8$ | Air distance | | |
| $r_4=-87.28$ | $d_4=1.8$ | $n_{d4}=1.6976$ | $v_4=38.7$ | |
| $r_5=+22.02$ | $d_5=5.1$ | $n_{d5}=1.6208$ | $v_5=31.1$ | $f_{II}=+100.0$ |
| $r_6=+32.60$ | $d_6=7.6$ | $n_{d6}=1.7885$ | $v_6=50.5$ | $\phi_{II}=33.8$ |
| $r_7=-52.29$ | | | | |

The two wide-angle supplementary components or attachments are corrected for a variable position of the entrance pupil E.P., and a variable object angle. The distance $a_1$ of the entrance pupil from the lens vertex facing the object of the first lens of the supplementary components is, by example in the wide-angle position of the variofocal objective P.O., with an object angle of approximately 22°, approximately 45. In the teleposition of the objective (approximately 6° object-angle) this distance $a_2$ is an even 100. The recited object angles are a necessary characteristic of limitations of an objective with which the supplementary components may be used. The change of the pupil position and the angular field of the lens brings about the result that the main rays pass the individual lenses at different heights and at different inclinations, according to the setting of the focal length of the variofocal objective. In the drawing, a main ray for the wide-angle setting of the variofocal objective and a second one for the teleposition of this objective are shown.

In spite of the above mentioned unfavorable conditions, the arrangement according to the present invention permits the elimination of the aberrations in the over-all range of the focal length. The costs are moderate, inasmuch as the glasses used—with exception of the last lens—are obtained by a relatively cheap mass-production. It is decisive for a cheap production of these supplementary components, that the diameters of the lenses are kept relatively small.

A considerable simplification in the production of the supplementary component results from the fact that the thickness of the lenses has only little influence on the correction of the aberrations. The permissible limits of production can thus be chosen relatively high.

The new supplementary components can be used not only in connection with variofocal objectives, but also with objectives with different focal length of standard construction.

While I have disclosed several embodiments of the present invention, it is to be understood that these embodiments are given by example only and not in a limiting sense, the scope of the present invention being determined by the claims.

I claim:

1. An afocal wide-angle supplementary objective for the use on the front of photographic objectives of different, positive refractive power comprising
   a negative cemented front doublet component,
   a positive cemented rear component axially aligned and approximately afocally spaced from said negative cemented front doublet component,
   said positive cemented rear component consisting of one negative and two positive lenses cemented together and defining two cemented surfaces,
   the rearmost of said two cemented surfaces having a positive refractive power,
   the other of said two cemented surfaces having a negative refractive power,
   both said cemented surfaces being concave to said following photographic objective,
   said negative cemented front doublet component and said positive cemented rear component including abnormal glass pairs, whereby one lens of said glass pairs has a higher refracting index and a higher Abbé dispersion number than the other lens of said glass pairs,
   said negative cemented front doublet component consisting of two lenses cemented together and defining one cemented surface,
   said one cemented surface having a negative refractive power,
   the surface of said negative cemented front doublet component remote from said positive cemented rear component being of a configuration within a range of being plane to being concave having a low curvature,
   the radius of the outer surface facing said positive cemented rear component being at least approximately two-thirds of the absolute value of the focal length of said negative cemented front doublet component,
   the difference of the refractive indices of the rearmost of said two cemented surfaces of said positive cemented rear component having a positive refractive power is at least 0.15,
   the radius of said rearmost of said two cemented surfaces is no more than one-third of the focal length of said positive cemented rear component,
   the difference of the refractive indices of said other of said two cemented surfaces of said positive cemented rear component having a negative refractive power is at least 0.07, and
   the radius of said other of said two cemented surfaces is within a range of one-fourth to one-fifth of the focal length of said positive cemented rear component.

2. The afocal wide-angle supplementary objective, as set forth in claim 1, wherein
   the radii, distances, thicknesses and focal lengths of said lenses have the following values:

[Magnification: 0.68]

| | | | | |
|---|---|---|---|---|
| $r_1 = -263.10$ | $d_1 = 6.1$ | $n_{d1} = 1.6208$ | $\nu_1 = 31.1$ | |
| $r_2 = -45.96$ | $d_2 = 2.3$ | $n_{d2} = 1.6584$ | $\nu_2 = 50.9$ | $f_I = -68.0$ |
| $r_3 = +57.91$ | $d_3 = 17.4$ | Air distance | | |
| $r_4 = -115.06$ | $d_4 = 1.9$ | $n_{d4} = 1.6976$ | $\nu_4 = 38.7$ | |
| $r_5 = +23.07$ | $d_5 = 5.4$ | $n_{d5} = 1.6208$ | $\nu_5 = 31.1$ | $f_{II} = +100.0$ |
| $r_6 = +32.47$ | $d_6 = 8.0$ | $n_{d6} = 1.7885$ | $\nu_6 = 50.5$ | |
| $r_7 = -59.25$ | | | | |

$r_1$ to $r_7$ representing the radii of the lenses,
$d_1$ to $d_6$ representing the thicknesses of the lenses and the air distances,
$n_{d1}$ to $n_{d6}$ representing the refractive indices for the $d$-line of the helium spectrum,
$\nu_1$ to $\nu_6$ representing the Abbé numbers,
$f_I$ and $f_{II}$, respectively, representing the focus of lens members I and II, and
$\phi_I$ and $\phi_{II}$ representing the refractive power of the objective members I and II.

3. The afocal wide-angle supplementary objective, as set forth in claim 1, wherein
   the radii, distances, thicknesses and focal lengths of said lenses have the following values:

[Magnification: 0.68]

| | | | | |
|---|---|---|---|---|
| $r_1 = -244.33$ | $d_1 = 5.8$ | $n_{d1} = 1.5750$ | $\nu_1 = 41.3$ | |
| $r_2 = -43.28$ | $d_2 = 2.2$ | $n_{d2} = 1.6204$ | $\nu_2 = 60.3$ | $f_I = -68.0$ |
| $r_3 = +55.57$ | $d_3 = 16.8$ | Air distance | | |
| $r_4 = -87.28$ | $d_4 = 1.8$ | $n_{d4} = 1.6976$ | $\nu_4 = 38.7$ | |
| $r_5 = +22.02$ | $d_5 = 5.1$ | $n_{d5} = 1.6208$ | $\nu_5 = 31.1$ | $f_{II} = +100.0$ |
| $r_6 = +32.60$ | $d_6 = 7.6$ | $n_{d6} = 1.7885$ | $\nu_6 = 50.5$ | |
| $r_7 = -52.29$ | | | | |

$r_1$ to $r_7$ representing the radii of the lenses,
$d_1$ to $d_6$ representing the thicknesses of the lenses and the air distances,
$n_{d1}$ to $n_{d6}$ representing the refractive indices for the $d$-line of the helium spectrum,
$\nu_1$ to $\nu_6$ representing the Abbé numbers,
$f_I$ and $f_{II}$, respectively, representing the focus of lens members I and II, and
$\phi_I$ and $\phi_{II}$ representing the refractive power of the objective members I and II.

References Cited by the Examiner

UNITED STATES PATENTS 1,352,028  9/1920  Ross _____ 88—57
2,324,057  7/1943  Bennett _____ 88—57

FOREIGN PATENTS 1,265,426  5/1961  France.

JEWELL H. PEDERSEN, *Primary Examiner.*